(12) United States Patent
Lee et al.

(10) Patent No.: US 8,237,314 B2
(45) Date of Patent: Aug. 7, 2012

(54) HORIZONTAL LINEAR VIBRATOR

(75) Inventors: Jee Sung Lee, Gyunggi-do (KR); Seok Jun Park, Gyunggi-do (KR); Jun Kun Choi, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 299 days.

(21) Appl. No.: 12/726,998

(22) Filed: Mar. 18, 2010

(65) Prior Publication Data

US 2011/0062803 A1 Mar. 17, 2011

(30) Foreign Application Priority Data

Sep. 11, 2009 (KR) .................. 10-2009-0085977

(51) Int. Cl.
*H02K 33/00* (2006.01)

(52) U.S. Cl. ....................................................... 310/15
(58) Field of Classification Search .................... 310/15, 310/17, 25, 30, 81
See application file for complete search history.

(56) References Cited

U.S. PATENT DOCUMENTS 7,671,493 B2 * 3/2010 Takashima et al. ............. 310/15
7,911,098 B2 * 3/2011 Lee et al. ......................... 310/81

* cited by examiner

*Primary Examiner* — Nguyen N Hanh
(74) *Attorney, Agent, or Firm* — Blakely Sokoloff Taylor & Zafman LLP

(57) ABSTRACT

Disclosed herein is a horizontal linear vibrator. The horizontal linear vibrator includes: a case and a bracket that are assembled with each other to form an inner space; a hollow coil that is installed in the case or the bracket; a vibrator that includes a magnetic field unit including one or more magnet disposed to penetrate through the inside of the hollow coil and a yoke formed to enclose the hollow coil and the magnets to generate magnetic field and a weight mounted in the magnetic field unit; a buffer member that is provided between the hollow coil and the yoke; and a spring member whose one end is fixed to the case or the bracket and other end is fixed to the vibrator and elastically supports the vibrator so as to horizontally move the vibrator. Thereby, there is provided the horizontal linear vibrator that has a horizontal vibration structure capable of maintaining the lifetime and response characteristics of the horizontal linear vibrator, implementing the sliminess thereof, increasing the vibration quantity thereof while controlling the motion displacement and improving the durability thereof.

7 Claims, 6 Drawing Sheets

HORIZONTAL LINEAR VIBRATOR

CROSS REFERENCE TO RELATED APPLICATION

This application claims the benefit of Korean Patent Application No. 10-2009-0085977, filed Sep. 11, 2009, entitled "HORIZONTAL LINEAR VIBRATOR", which is hereby incorporated by reference in its entirety into this application.

BACKGROUND OF THE INVENTION

1. Technical Field

Currently, a vibration generating device, which is one of several signal receiving indicating devices used in communication devices, such as cellular phones, converts electric energy into mechanical vibration by the use of a principle of generating electromagnetic force. That is, the vibration generating device has been mounted in the mobile phone to be used to notify mute signal reception.

2. Description of the Related Art

In recent, as the use of the mobile phone in a touch screen scheme is rapidly increased, the vibration generating device has been widely adopted for a touch screen mobile phone. Since the use frequency of the vibration generating device used for the touch screen mobile phone is more increased than the case used for the receiving notification, the operational life time should be increased and the response speed should be rapid to meet the touch speed so as to increase the touch satisfaction of the user.

A vibration generating device according to an embodiment of the related art uses a scheme that obtains mechanical vibration by rotating a vibrator having an eccentric weight. The rotating force of the rotor is obtained by a commutator or brush-type motor structure that supplies current to a coil of the rotor through contacts of the brush and the commutator by a rectifying action.

However, the vibration generating device having such a form causes mechanical friction and electrical spark and abrasion while the brush passes through a gap between segments of the commutator and thus, generates foreign materials such as black powder, thereby reducing the lifetime of the vibration generating device. In addition, when the vibration generating device is applied with voltage, it takes much time to reach targeted vibration quantity due to the rotational inertia thereof. As a result, the vibration generating device does not implement the vibration that is in particular suitable for the touch screen mobile phone. Therefore, a linear vibrator that can stably obtain linear vibration, in particular, a vertical linear vibrator has been proposed.

FIG. 1 is a cross-sectional view of a vertical linear vibrator according to the related art.

As shown in FIG. 1, a vertical linear vibrator 10 according to the related prior art is configured to include a case 20 that partitions an internal space, a bracket 30 that is installed with a coil 32 disposed at a lower part of the case 20 and supplied with current to induce magnetic field and a damper member 34, a vibrator 40 that includes a yoke 42 formed with a hollow portion whose one surface is closed, magnets 44 received in the hollow portion and having a plate yoke 43 attached to a lower surface thereof, and a weight 46 coupled with the outside of the yoke 42, and a spring member 50 that is coupled at an upper part of the case 20 and elastically supports a vibrator 40 so as to linearly move the vibrator 40. At this time, the yoke 42 is configured to include a circular plate portion 42a and an edge portion 42b that is extended to be bent downward from both ends of the circular plate portion 42a.

The vertical linear vibrator 10 having the configuration vibrates the vibrator 40 up and down through the spring member 50 by the interaction between magnetic field generated from a magnetic circuit that is configured of the magnets 44, the plate yoke 43, and the yoke 42 and electric field generated from the coil 32.

Herein, the damper member 34 limits the motion displacement of the vibrator that vibrates up and down and reduces the impact of the vibrator 40 and the bracket 30 during the falling or operating, thereby improving the durability and minimizing the discontinuous operation caused due to the friction.

Since the vibration quantity is proportional to a product of the weight and displacement of the vibrator 40 in the vertical linear vibrator 10 according to the related art, the weight or displacement of the vibrator 40 should be increased to secure the necessary body-sensing vibration quantity, which leads to the increase in the vertical thickness of the vertical linear vibrator 10. In particular, there is a problem in that this runs counter to the trend of the miniaturization and slimness of the mobile phone.

SUMMARY OF THE INVENTION

The present invention has been made in an effort to provide a horizontal linear vibrator that has a horizontal vibration structure capable of making a linear vibrator slim and improving vibration quantity thereof while maintaining lifetime and response characteristics of the linear vibrator and can control motion displacement of the vibrator and improve durability thereof.

According to an exemplary embodiment of the present invention, a horizontal linear vibrator includes: a case and a bracket that are assembled with each other to form an inner space; a hollow coil that is installed in the case or the bracket; a vibrator that includes a magnetic field unit including one or more magnet disposed to penetrate through the inside of the hollow coil and a yoke formed to enclose the hollow coil and the magnets to generate magnetic field and a weight mounted in the magnetic field unit; a buffer member that is provided between the hollow coil and the yoke; and a spring member whose one end is fixed to the case or the bracket and other end is fixed to the vibrator and elastically supports the vibrator so as to horizontally move the vibrator.

The buffer member is provided at one end of the hollow coil.

The buffer member is a ring shape where a hollow portion through which the magnets penetrate is formed therein.

The inside of the case or the bracket is provided with the hollow portion through which the magnets penetrate and the outside surface thereof is provided with a bobbin into which the hollow coil is inserted and supported and the buffer member is provided at the outside surface of the bobbin.

The buffer member is provided at the inner side of the yoke.

The magnets are oppositely provided, putting a magnetic core therebetween so that the same poles face each other.

In addition, the spring member is provided with a damper member.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
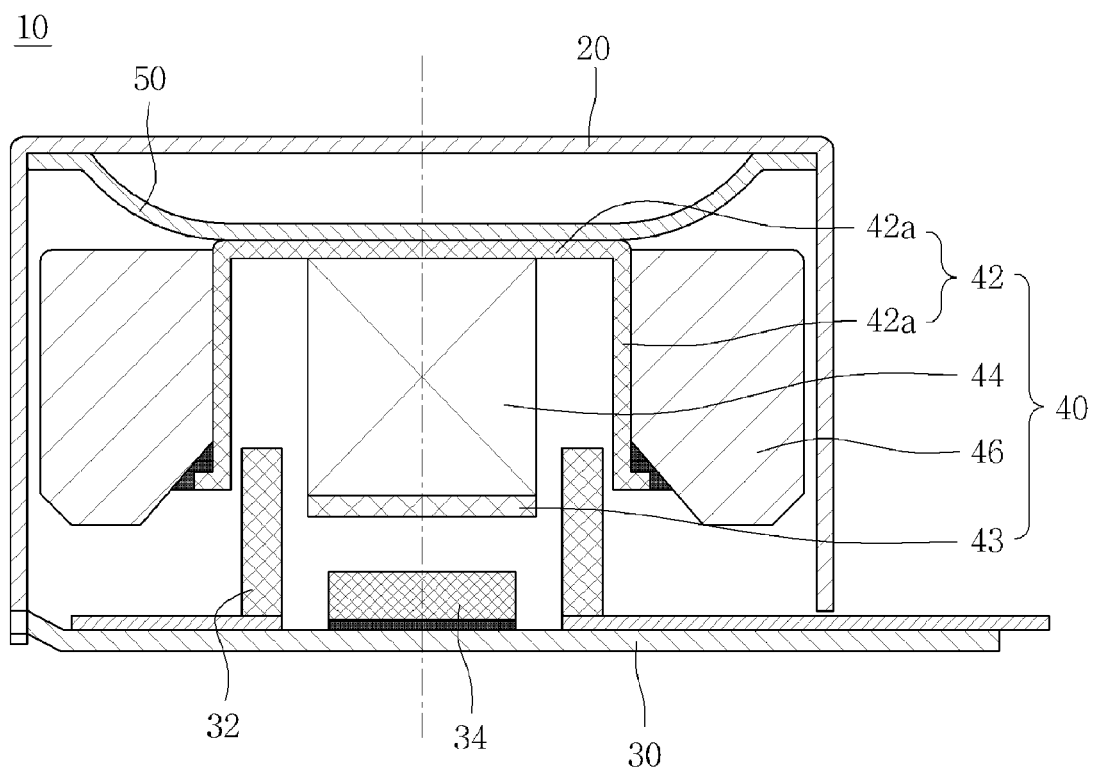
FIG. 1 is a cross-sectional view of a vertical linear vibrator according to the related art.

The features and advantages of the present invention will be more obvious from the following description with reference to the accompanying drawings.

Terms or words used in the specification and claims herein should be not construed as a general and lexical meaning and should be construed as the meaning and concept meeting the technical idea of the present invention based on a principle that the present inventors can properly define the concepts of terms in order to elucidate their own invention in the best method.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in describing the present invention, a detailed description of related known functions or configurations will be omitted so as not to obscure the subject of the present invention.

Hereinafter, exemplary embodiments of the present invention will be described in detail with reference to the accompanying drawings.

Figure 2:
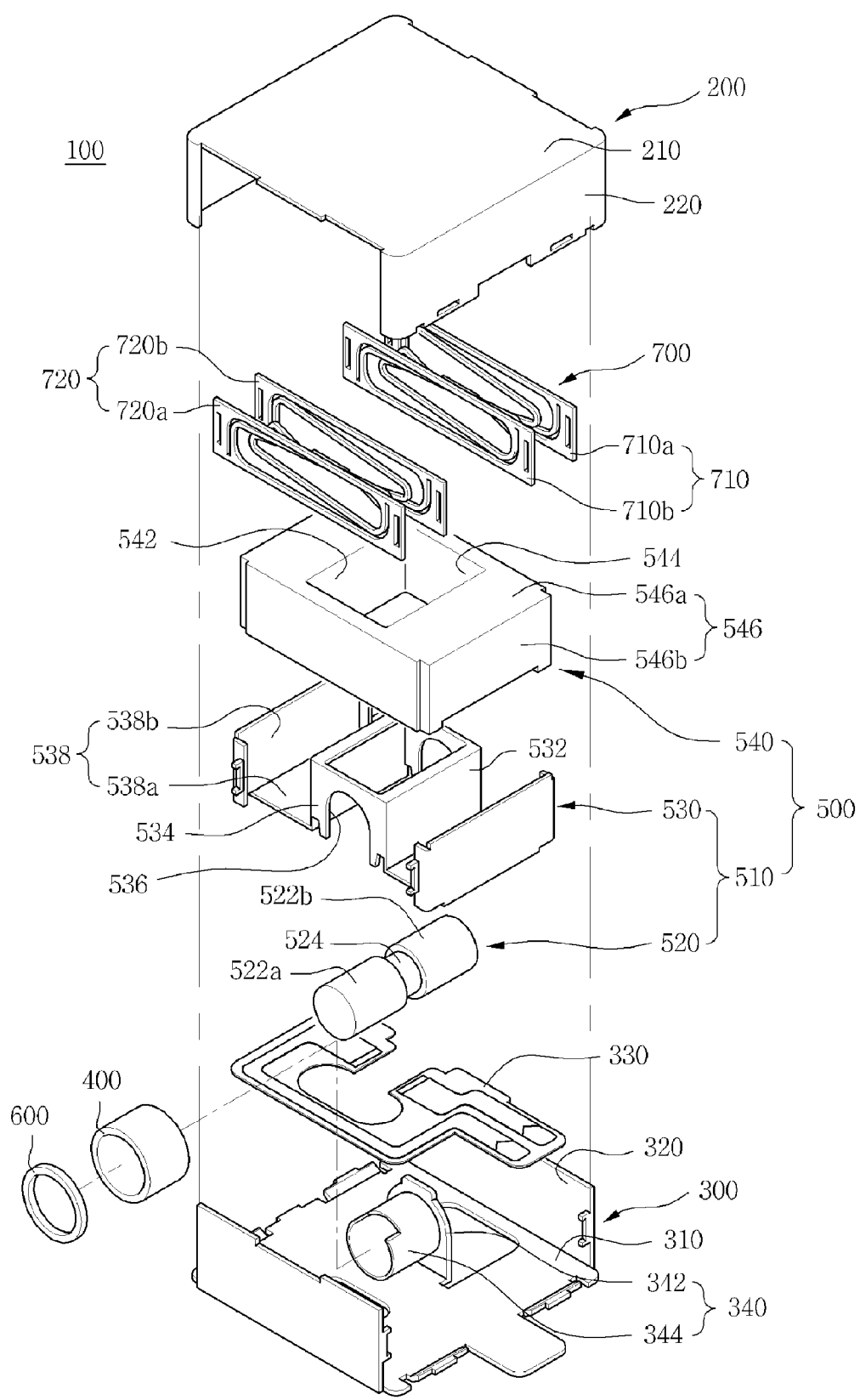
FIG. 2 is an exploded perspective view of a horizontal linear vibrator according to an exemplary embodiment of the present invention.
Figure 3:
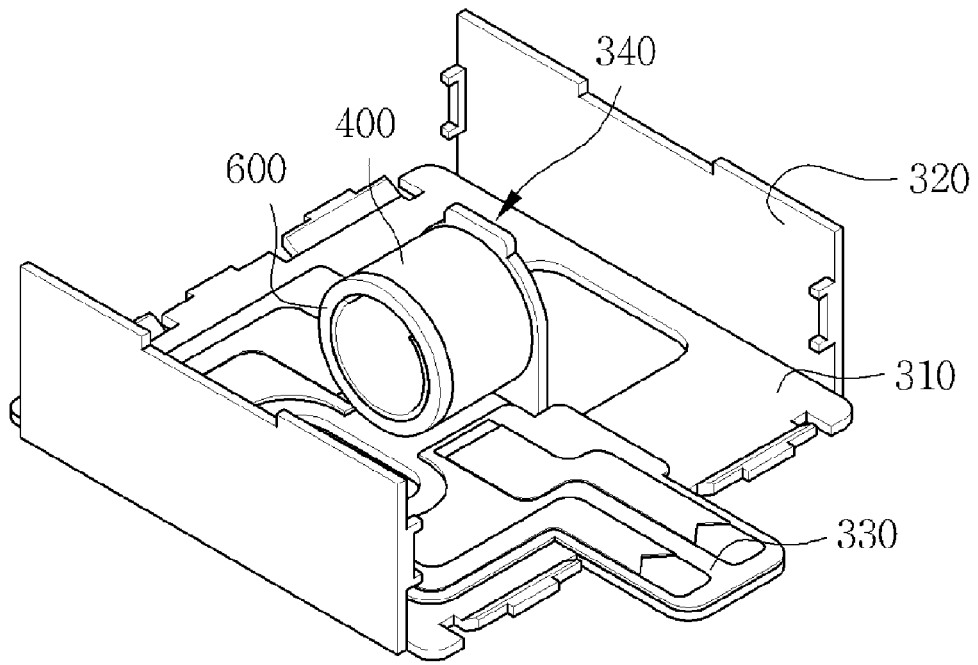
FIG. 3 is an assembled perspective view of a bracket, a circuit substrate, a hollow coil, and a buffer member shown in FIG. 2.
Figure 4:
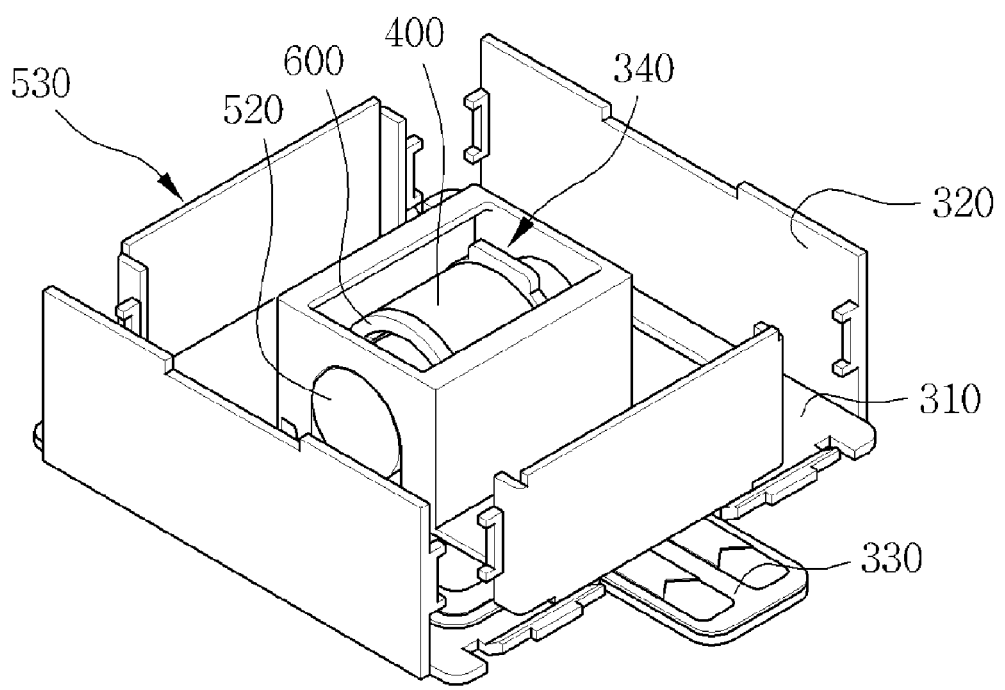
FIG. 4 is an assembled perspective view of the case where a magnetic field unit is coupled to FIG. 3.
Figure 5:
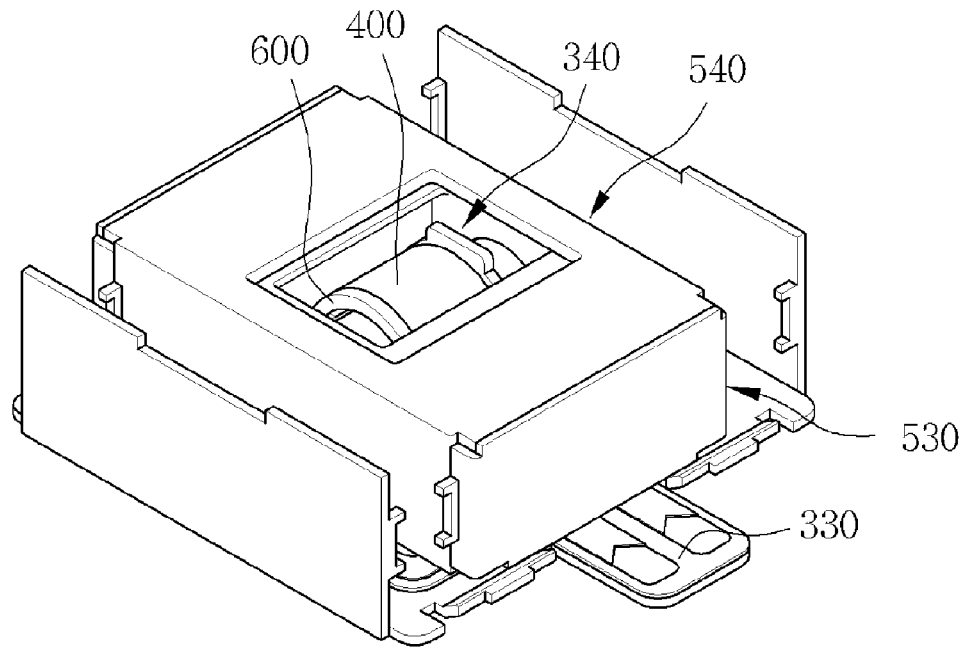
FIG. 5 is an assembled perspective view of the case where a weight is coupled to FIG. 4.
Figure 6:
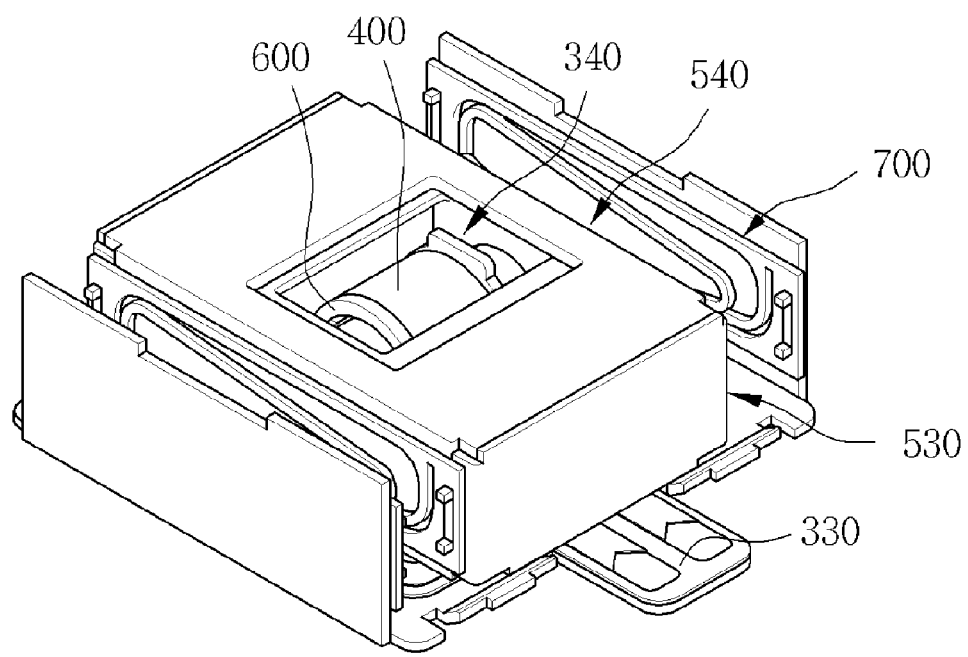
FIG. 6 is an assembled perspective view of the case where the spring member is coupled to FIG. 5.
Figure 7:
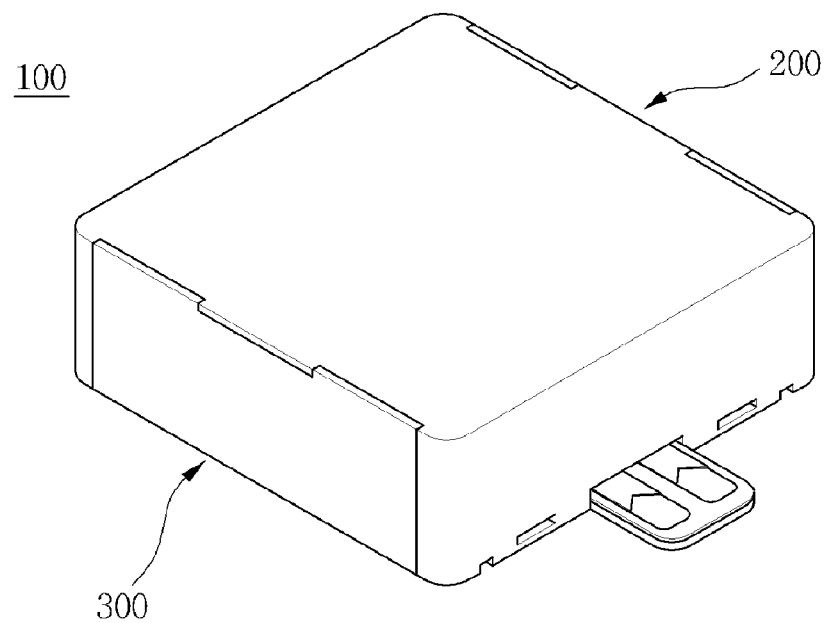
FIG. 7 is an assembled perspective view of the horizontal linear vibrator shown in FIG. 2.

FIG. 2 is an exploded perspective view of a horizontal linear vibrator according to an exemplary embodiment of the present invention. FIG. 3 is an assembled perspective view showing a bracket, a circuit board, a hollow coil, a buffer member that are shown in FIG. 2, FIG. 4 is an assembled perspective view of a magnetic field unit and FIG. 3, FIG. 5 is an assembled perspective view of a weight and FIG. 4, FIG. 6 is an assembled perspective view of a spring member and FIG. 5, and FIG. 7 is an assembled perspective view of a horizontal linear vibrator shown in FIG. 2. Hereinafter, a horizontal linear vibrator 100 will be described with reference to the drawings.

As shown in FIGS. 2 to 6, the horizontal linear vibrator 100 according to the exemplary embodiments is configured to include a case 200, a bracket 300, a hollow coil 400, a vibrator 500, a buffer member 600, and a spring member 700.

The case 200 and the bracket 300 protect the horizontal linear vibrator from the outside and provide a displacement space for the vibrator 500 to vibrate in the horizontal direction. That is, the case 200 and the bracket 300 are a member providing an internal space for the horizontal linear vibrator. In detail, the internal space is defined by the assembly of the case 200 and the bracket 300.

The case 200 may have any structure, so long as it forms an internal space when it is assembled with the bracket 300. Preferably, the case 200 has a rectangular structure whose longitudinal length (the horizontal vibration direction of the vibrator) is longer than that in the lateral direction, so that the horizontal displacement space of the vibrator can be sufficiently guaranteed.

For example, the case 200 is configured to include a case upper plate 210 and a longitudinal side portion 220 that is bent perpendicularly down therefrom so that a lower part and a transversal (a direction perpendicular to the horizontal vibration direction of the vibrator) side portion have an opened structure. The bracket 300 is configured to have a structure where an upper part and a longitudinal side portion thereof are opened in order to correspond to the case 200. That is, the bracket 300 is configured to have a bracket lower plate 310 and a transversal side portion 320. However, the structure of the case 200 and the bracket 300 shown in FIGS. 2 to 6 is nothing but an exemplary structure where the internal space formed by assembling the case 200 and the bracket 300 is partitioned, wherein the vibrator 500 is vibrated horizontally in the internal space. It is apparent that the structure can be changed variously so long as it can achieve the same functions. It is to be noted that the changed structures fall within the scope of the present invention.

At this time, the circuit board 330 is mounted on the bracket lower plate 310. The circuit board 330 is connected to external input terminals and transfers the applied power to the hollow coil 400. In the drawings, although the circuit board 330 has been illustrated as being provided separately from the bracket 300, they may be integrally formed into a single body made of the same material.

Meanwhile, a bobbin 340 may be mounted on the bracket lower plate 310 to support the hollow coil 400. The bobbin 300 will be described in more detail in the description of the hollow coil 400.

The hollow coil 400 generates an electric field of a predetermined intensity when external power is applied thereto. The hollow coil 400 has a hollow portion therein so as to penetrate magnets 522a and 522b and is mounted to the case 200 or the bracket 300.

For example, the hollow coil 400 is mounted to the bracket lower plate 310 in order that the central axis direction of the hollow coil 400 conforms to the horizontal vibration direction of the vibrator. In FIG. 2, although the hollow coil 400 is shown as being mounted to the bracket lower plate 310, the mounting position may be shown by way of example. The hollow coil 400 connects a coil line to a pattern portion on the circuit board 330 by a soldering so that it is supplied with power. In the drawings, although the hollow coil 400 is shown as having a cylindrical structure, this is provided by way of example only. Therefore, the hollow coil 400 in any shape can be used as long as it has the hollow portion therein.

It is preferable that the hollow coil 400 is fixedly mounted to the bracket lower plate 310 to prevent it from separating in use. A method for fixing the hollow coil 400 is not limited. As shown in the drawings, it is preferable that the hollow coil 400 is fixed by the bobbin 340 into which the hollow coil 400 is inserted. For example, the bobbin 340 has a shape where the hollow coil 400 is inserted and supported into the outer surface thereof in the state where one side thereof is fixedly mounted to the bracket lower plate 310. Specifically, the bobbin 340 is configured to include a vertical plate portion 324 that is mounted perpendicularly to the bracket lower plate 310 in parallel with the transversal side portion 320 of the bracket 300 and is formed with the hollow portion through which the magnets 522a and 522b penetrate and a coil insertion portion 344 that is extendedly formed in the horizontal vibration direction of the vibrator from one side or both sides of the vertical plate portion 324, has a shape where the hollow coil 400 may be inserted and supported into the outer surface of the bobbin 340, and is formed with the hollow portion therein so as to penetrate the magnets 522a and 522b. Although the coil insertion portion 344 is shown as having a cylindrical structure corresponding to the structure of the hollow coil 400 having a cylindrical shape, it is apparent that the structure may be changed corresponding to the shape of the hollow coil 400.

The vibrator 500 performs horizontal linear vibration. The vibrator 500 is configured to include a magnetic field unit 510 and a weight 540.

The magnetic field unit 510 generates electromagnetic force to horizontally vibrate the vibrator. The magnetic field unit 510 is configured to include a magnet unit 520 and a yoke 530. Specifically, the magnetic field unit 510 has a structure to enclose the side parts of the magnets 522a and 522b with the yoke 530, wherein the magnets 522a and 522b are disposed putting a magnetic core 524 therebetween so that the same poles face each other. In other words, the magnetic field unit 510 has a structure where the magnet unit 520 transverses in the rectangular yoke 530, that is, a structure of "日". The horizontal linear vibrator 100 increases the width of the horizontal direction to increase the weight and motion displacement of the vibrator, thereby making it possible to increase the vibration force. However, when the size of the magnets 522a and 522b and the hollow coil 400 is increased, the vertical thickness of the horizontal linear vibrator is increased, such that it may be difficult to secure large driving electromagnetic force. However, the magnetic field unit 510 has the above-mentioned structure, thereby making it possible to concentrate magnetic flux at a place where it is linked with the hollow coil 400. Therefore, it is possible to generate the larger driving electromagnetic force without increasing the size of the magnets 522a and 522b and the hollow coil 400.

The magnet unit 520 generates the magnetic field of predetermined intensity to linearly vibrate the vibrator by the interaction with the hollow coil 400. To this end, the magnet unit 520 uses one or more magnets 522a and 522b. For example, the magnet unit 520 has a structure where the magnets 522a and 522b are attached to both sides of the magnetic core 524. The first magnet 522a attached to one side of the magnetic core 524 and the second magnet 522b attached to the other side of the magnetic core 524 are disposed so that the same poles face each other.

It is preferable that magnetic fluid (not shown) is applied on an outer peripheral surface of the magnet unit 520 to prevent it from directly contacting an inner peripheral surface of the coil insertion portion 344 of the bobbin 340 when the vibrator is vibrated horizontally. At this time, the magnetic fluid is fixedly disposed on the outer peripheral surface of the magnet unit 520 in a cylindrical shape by the leakage flux of the magnets 522a and 522b. The magnetic fluid stably disperses magnetic powder in liquid to have a colloidal shape. Next, a surfactant is added to the liquid to prevent deposition or agglutination of the magnetic powder due to gravity or the magnetic field, etc. For example, magnetic fluid formed by dispersing triiron tetroxide or iron-cobalt alloy particles in oil or water is used and, recently, magnetic fluid formed by dispersing cobalt in toluene is being used. Such magnetic powder is an ultrafine particle powder ranging from 0.01 μm to 0.02 μm and moves under Brownian motion that is one of the specific characteristics of ultrafine particles. In addition, the magnetic fluid is characterized in that even if an external magnetic field, gravity, centrifugal force, etc. is applied thereto, the density of magnetic powder particles in the fluid remains constant.

The yoke 530 smoothly forms the magnetic flux of the magnet unit 520 to configure a magnet closed circuit. The yoke 530 includes the hollow coil 400 therein and has an internal space in which the magnet unit 520 receives. In addition, the yoke 530 is formed to have a structure where the upper part and the lower part thereof are opened.

For example, when the upper and lower parts of the yoke 530 are opened, the yoke 530 is configured to include a yoke longitudinal side portion 532 and a yoke transversal side portion 534 so that a space receiving the magnets 522a and 522b and the hollow coil 400 are formed therein. At this time, the yoke 530 encloses the side of the magnet unit 520 while having the internal space capable of receiving the hollow coil 400 along with the magnet unit 520. Further, it is preferable that the yoke 530 has a width so that the yoke longitudinal side portion 532 may be adjacently disposed to the hollow coil 400 and the yoke transversal side portion 534 may be adjacently disposed to the ends of the magnets 522a and 522b.

Herein, the yoke transversal side portion 580 has a size so that the inner peripheral surface thereof contacts the end of the magnet unit 520, thereby making it possible to contact and support the magnet unit 520. However, when the vibrator 400 is linearly vibrated, it is preferable that the yoke transversal side portion 580 has a structure so that it is easy to assemble the magnet unit 520 without the magnet 520 being separated in the yoke 550.

Figure 8:
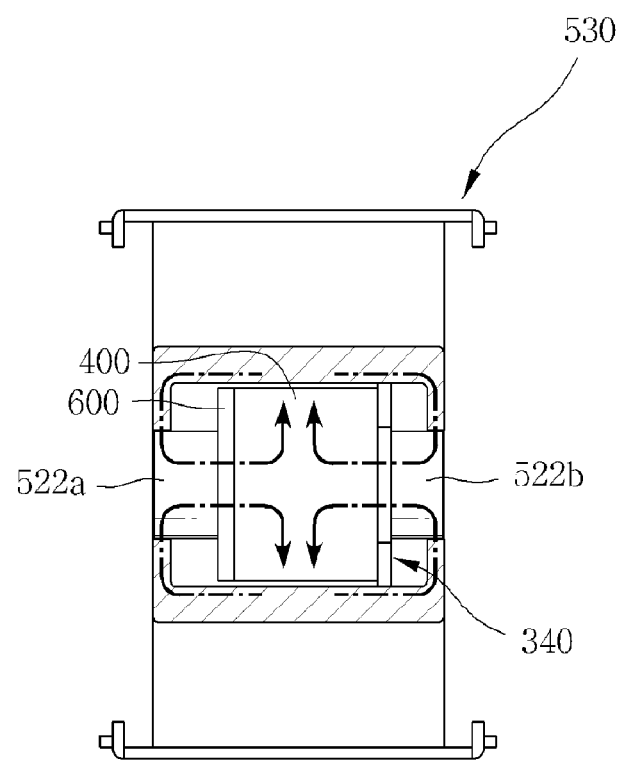
FIG. 8 is a diagram for explaining a magnetic flux flow of a magnetic field unit according to an exemplary embodiment of the present invention.

In other words, the yoke 530 may adopt a structure where a groove portion 536 is provided at the yoke transversal side portion 534 and both ends of the magnets 522a and 522b are received in the groove portion 536. At this time, the groove portion 536 has a shape corresponding to the shape of the magnets 522a and 522b. However, it is preferable that the groove portion 536 has a structure where it is opened to the lower part of the yoke transversal side portion 534 to facilitate the assembly of the yoke 530. Herein, the ends of the magnets 522a and 522b exposed by the groove portion 536 are covered by the weight 540. Meanwhile, the area where the magnets 522a and 522b are exposed by the groove portion 536 does not have the structure where the sides of the magnets 522a and 522b are enclosed by the yoke 530. However, since the yoke 530 is adjacently disposed to the sides of the magnets 522a and 522b, the magnetic flux generated from the magnets 522a and 522b flows along the yoke 530 as shown in FIG. 8.

Meanwhile, the yoke 530 may be configured to include a yoke extension portion 538 that includes a horizontal extension portion 538a extending in a horizontal direction from a lower end of the yoke longitudinal side portion 532 and a vertical extension portion 538b bent upward from an end of the horizontal extension portion 538a, in consideration of assembly with the weight 540.

The magnetic field unit 500 having the above-mentioned structure increases the magnetic efficiency. The magnetic flux flow of the magnetic field unit 510 will be described in more detail with reference to FIG. 9.

The weight 540 adds a predetermined mass to the vibrator to linearly vibrate the vibrator. The weight 540 is mounted to the magnetic field unit 510. For example, the central portion of the weight 540 is provided with a penetration portion. The yoke 530 is inserted and fixed into the penetration portion so that the weight 540 is coupled with the outer side of the yoke 530.

Specifically, when the upper and lower parts of the weight 540 are opened, the weight 540 is configured to include a weight longitudinal side portion 542 and a weight transversal side portion 544 so that a space receiving the yoke 530 are formed therein. At this time, the weight 540 may be configured to include the yoke extension portion 546 that includes a horizontal extension portion 546a extending in a horizontal direction from the upper ends of the side portions 542 and 544 of the weight 540 and a vertical extension portion 546b bent downward from the end of the horizontal extension portion 546a, in consideration of assembly with the yoke 530.

The buffer member 600 controls the motion displacement of the vibrator and improves durability by preventing the vibrator 500 from directly contacting the bracket 300. The buffer member 600 is provided between the hollow coil 400 and the yoke 530.

Specially, the buffer member 600 is interposed in one end of the hollow coil 400 to prevent the hollow coil 400 from direct contacting the inner side of the yoke 530, thereby controlling the motion displacement of the vibrator 500 and preventing the vibrator 500 from directly contacting the bracket 300. At this time, when the hollow coil 400 is inserted and fixed into the coil insertion portion 344 of the bobbin 340, it is preferable that the buffer member 600 is also fixed to the outer surface of the coil insertion portion 344. For example, the buffer member 600 is formed in a ring shape having the hollow portion.

The spring member 700 elastically supports the vibrator 500 to allow the vibrator to linearly move. One side of the spring member is fixed to the vibrator 500 in the state where the other side thereof is fixed to the transversal side portion 320 of the bracket 300, thereby elastically supporting the vibrating 500.

Herein, it is preferable that the spring member 700 is provided at both sides of the vibrator 500 in pair. It is preferable that the spring member 710 provided at one side of the vibrator 500 is configured in a combination of two plate springs 710a and 710b and the spring member 720 provided at the other side of the vibrator 500 is configured in a combination of two plate springs 720a and 720b. At this time, it is preferable that the spring member 500 is provided with a damper member (not shown) that controls the motion displacement of the vibrator 500 and prevents the direct friction of the bracket 300 and the vibrator 500. The damper member may be provided between the two plate springs 720a and 720b.

For convenience of illustration, although the plate spring as the spring member 700 is shown in the drawings, this is provided by way of example only. In addition to a coil spring, any member capable of elastically supporting the vibrator 500 can be adopted.

FIG. 8 is a diagram for explaining the magnetic flux of the magnetic field unit according to the exemplary embodiment of the present invention. Hereinafter, the flux flow of the magnetic field unit according to the exemplary embodiment will be described.

As shown in FIG. 8, in the exemplary embodiment, the magnetic flux (see an arrow) of the magnetic field portion is diffused from the magnetic core 524 to the yoke longitudinal side portion 532 that encloses the magnet unit 520 since the magnets 522a and 522b are disposed putting the magnetic core 524 therebetween so that the same poles face each other. At this time, the flux that is radially diffused to the yoke longitudinal side portion 531 is concentrated at the place where the magnetic core 524 exists, that is, the place where it is linked with the hollow coil 400, which can implement the larger electromagnetic force when consuming the same current in the same volumes. As a result, it increases the displacement of the vibrator, thereby making it possible to implement the larger vibration force.

At this time, the yoke 530 formed to enclose the magnet unit 520 configures the magnetic closed circuit in which the above-mentioned flux flow is generated, such that the effect of the magnetic attraction force of the magnets 522a and 522b on the case 200 and/or the bracket 300 is minimized, thereby making it possible to prevent the vibrator from being sunk to one direction due to the magnetic attraction force.

Figure 9:
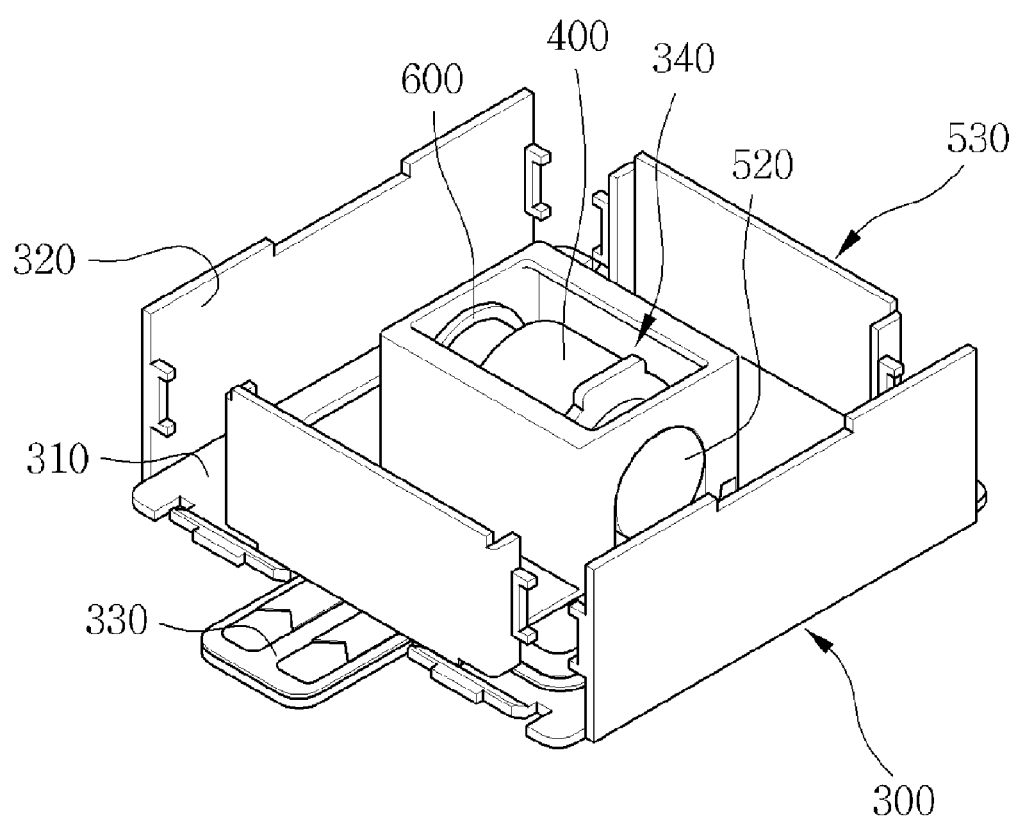
FIG. 9 is a diagram for explaining a mounting state of a buffer member according to another exemplary embodiment of the present invention.

FIG. 9 is a diagram for explaining a mounting state of a buffer member according to another exemplary embodiment of the present invention.

As shown in FIG. 9, the buffer member 600 may be provided at the inner side of the yoke 530 to prevent the yoke 530 from directly contacting the hollow coil 400. In other words, the buffer member 600 is formed to enclose the groove portion 536 formed at the transversal side portion 534 of the yoke 530. The mounting state of the buffer member 600 performs the same functions of the foregoing embodiments and therefore, the detailed description thereof will be omitted.

According to the present invention, it can make the horizontal linear vibrator slim without needing to secure the motion displacement of the vibrator in the vertical direction since the vibrator vibrates in a horizontal direction.

In addition, according to the present invention, it designs the long horizontal linear vibrator in the horizontal vibration direction, thereby making it possible to secure the motion displacement of the vibrator in the horizontal direction and increase the vibration quantity.

Further, according to the present invention, the buffer member is not formed in the spring member, thereby making it possible to prevent the damage of the buffer member as well as the impact from being absorbed in the spring member. Moreover, since the buffer member is disposed between the hollow coil and the inner side of the yoke, there is no problem of hindering the straight horizontal motion of the vibrator and the displacement of the vibrator can be controlled during the falling. In particular, when the buffer member is inserted into the bobbin, the assembling performance and production are improved.

Further, according to the present invention, the magnets are disposed so that the same poles face each other and the yoke is formed to enclose the side of the magnet unit to increase the magnetic flux flow linked with the coil, thereby making it possible to increase the driving electromagnetic force and the effect of magnetic force of the magnets on the bracket and/or the case is minimized, thereby making it possible to prevent the vibrator from being sunk to one direction.

Although the embodiment of the present invention has been disclosed for illustrative purposes, it will be appreciated that a horizontal linear vibrator according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A horizontal linear vibrator, comprising:
   a case and a bracket that are assembled with each other to form an inner space;
   a hollow coil that is installed in the case or the bracket;
   a vibrator that includes a magnetic field unit including one or more magnet disposed to penetrate through the inside of the hollow coil and a yoke formed to enclose the hollow coil and the magnets to generate a magnetic field and a weight mounted in the magnetic field unit;

a buffer member that is provided between the hollow coil and the yoke; and a spring member whose one end is fixed to the case or the bracket and whose other end is fixed to the vibrator and elastically supports the vibrator so as to horizontally move the vibrator.

2. The horizontal linear vibrator as set forth in claim 1, wherein the buffer member is provided at one end of the hollow coil.

3. The horizontal linear vibrator as set forth in claim 2, wherein the buffer member is a ring shape where a hollow portion through which the magnets penetrate is formed therein.

4. The horizontal linear vibrator as set forth in claim 1, wherein the inner space of the case or the bracket is provided with the hollow portion through which the magnets penetrate and the outside surface thereof is provided with a bobbin into which the hollow coil is inserted and supported and, the buffer member is provided at the outside surface of the bobbin.

5. The horizontal linear vibrator as set forth in claim 1, wherein the buffer member is provided at the inner side of the yoke.

6. The horizontal linear vibrator as set forth in claim 1, wherein the magnets are oppositely provided, putting a magnetic core therebetween so that the same poles face each other.

7. The horizontal linear vibrator as set forth in claim 1, wherein the spring member is provided with a damper member.

* * * * *